(12) United States Patent  
Petit et al.

(10) Patent No.: US 10,435,625 B2  
(45) Date of Patent: Oct. 8, 2019

(54) RESIN COATED PROPPANT PARTICLE AND METHOD OF MAKING THE SAME

(71) Applicant: Saint-Gobain Ceramics & Plastics, Inc., Worcester, MA (US)

(72) Inventors: Morgane Petit, Paris (FR); Pierre Salomon, Paris (FR)

(73) Assignee: Saint-Gobain Ceramics & Plastics, Inc., Worcester, MA (US)

(*) Notice: Subject to any disclaimer, the term of this patent is extended or adjusted under 35 U.S.C. 154(b) by 0 days.

(21) Appl. No.: 15/842,953

(22) Filed: Dec. 15, 2017

(65) Prior Publication Data

US 2018/0171214 A1    Jun. 21, 2018

Related U.S. Application Data

(60) Provisional application No. 62/436,483, filed on Dec. 20, 2016.

(51) Int. Cl.
| | | |
|---|---|---|
| B32B 5/16 | (2006.01) | |
| C09K 8/80 | (2006.01) | |
| C09D 105/00 | (2006.01) | |
| E21B 43/267 | (2006.01) | |
| B01J 2/00 | (2006.01) | |

(52) U.S. Cl.
CPC ............ C09K 8/805 (2013.01); C09D 105/00 (2013.01); B01J 2/003 (2013.01); E21B 43/267 (2013.01)

(58) Field of Classification Search
CPC ... C09K 8/03; C09K 8/48; C09K 8/56; C09K 8/62; Y10T 428/2991
USPC ................................................. 428/403, 407
See application file for complete search history.

(56) References Cited

U.S. PATENT DOCUMENTS

| 2007/0173414 A1* | 7/2007 | Wilson, Jr. ............... C09K 8/04 507/240 |
| 2016/0215208 A1* | 7/2016 | Monastiriotis .......... C09K 8/805 |
| 2016/0289550 A1* | 10/2016 | Vo ............................. C09K 8/74 |

* cited by examiner

Primary Examiner — Hoa (Holly) Le  
(74) Attorney, Agent, or Firm — Stewart A. Fraser

(57) ABSTRACT

A particle with an environmentally friendly resin coating having very low levels of leachable compounds is disclosed. The water leachable phenolic content of the coated particle is low enough to eliminate problems with leaching of phenol or its derivatives into an aquifer during downhole applications. Processes for fully and partially coating the particle with the resin coating are also disclosed.

29 Claims, 2 Drawing Sheets

RESIN COATED PROPPANT PARTICLE AND METHOD OF MAKING THE SAME

CROSS-REFERENCE TO RELATED APPLICATION

This application claims the benefit of U.S. Provisional Application No. 62/436,483 filed Dec. 20, 2016.

BACKGROUND OF THE INVENTION

This invention generally relates to ceramic particles for use as a proppant to facilitate the removal of liquids and/or gases from wells that have been drilled into geological formations. More specifically this invention is directed to resin coated proppants wherein leachable compounds in the resin may contaminate the environment including the ground water.

Examples of patents and published patent applications directed to resin coated proppants include U.S. Pat. Nos. 4,439,489; 3,935,339 and 4,694,905. Embodiments of the present invention provide a resin coated proppant that is chemically stable in downhole applications. The composition of the proppant is selected to eliminate or greatly reduce water leachable phenolic compounds.

SUMMARY

Embodiments of the present invention provide a resin coated proppant which precludes the leaching of formaldehyde and/or phenolic based resin in downhole conditions.

In one embodiment, the present invention includes a proppant particle comprising an inorganic substrate and a polymeric coating produced by the reaction of at least one sugar and at least one compound selected from the group consisting of: (1) an ammonium or metal salt of an inorganic acid, and (2) an organic polycarboxylic acid or anhydride thereof. The coating may be secured to the surface of the substrate and exposed to the environment surrounding the proppant particle.

Another embodiment relates to a process for manufacturing a proppant particle that may include the following steps. Providing an inorganic substrate heated to a temperature greater than 100° C. Providing a liquid resin comprising at least one sugar and at least one compound selected from the group consisting of: (1) an ammonium or metal salt of an inorganic acid and (2) an organic polycarboxylic acid or anhydride thereof. Coating the substrates with the liquid resin. Treating the substrate coated with the liquid resin to cause the formation of a polymeric layer on the surface of the inorganic substrate.

DETAILED DESCRIPTION

Figure 1:
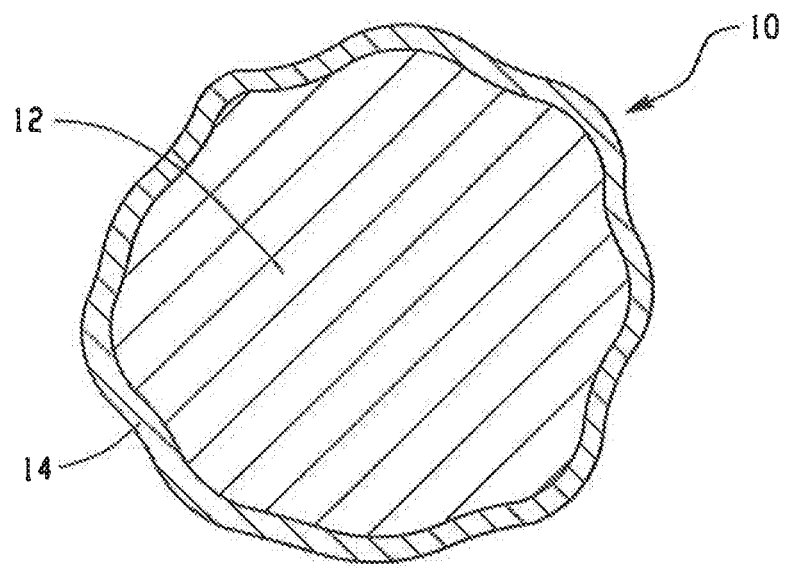
FIG. 1—a cross-section of a first embodiment of a proppant of this invention.

As used here, the phrase "cured resin" means a resin that has been completely crosslinked prior to the resin coated proppant being inserted into a downhole application. The phrase "non-cured resin" refers to a resin coated proppant wherein the resin has not been completely crosslinked prior to inserting the resin coated proppant in a downhole application. As used here, the term "inorganic substrate" may refer to naturally occurring proppant materials, such as sand, or manmade proppant materials such as sintered particles, bonded non-sintered particles or glass beads.

Technology that uses particles to facilitate the removal of hydrocarbon based fluids, such as natural gas and crude oil, from downhole wellbores has been documented in numerous patents and journal articles. Particles, which may be referred to as proppants, are used to prop open fissures in the earth through which the gas and oil flow toward the wellborn. The proppants are delivered into the fissures of a subterranean formation by mixing the proppants with the fracturing fluid which is forced through the wellborn and into the fissures. When the fracturing fluid is removed the particles remain lodged in the fissures thereby propping open the fissures. In wells where proppants are not used, the fissures in the earth located closest to the wellbore may collapse soon after the gas and oil located closest to the wellbore have been removed. In contrast, the productivity of wells that use proppants may be improved because the proppants prop open the fissures in the earth that would otherwise close after removal of the hydrocarbon based fluids.

Due to the ongoing need to provide larger and larger quantities of natural gas and oil and the simultaneous depletion of readily available gas and oil located near the surface of the earth, new wells must be drilled deeper than older wells in order to reach the previously untapped reservoirs of oil and gas. As the depth of the wellbore increases the pressure exerted on the proppant by the earth also increases. Consequently proppant manufacturers need to produce proppants that can withstand higher pressures than proppants previously known in the art in order to resist crushing at the deeper well depths. A proppant's ability to withstand crushing may be characterized as crush resistance which is a term commonly used to denote the strength of a proppant. A proppant's crush resistance may be determined using ISO 13503-2:2006(E). A strong proppant generates a lower weight percent of fines than a weak proppant at the same closure stress. For example, a proppant that has a 2 weight percent of fines is considered to be a strong proppant and is preferred to a weak proppant that has a 10 weight percent of fines at the same pressure.

In addition to providing proppants with high crush strengths, proppants used in locations that are near to aquifers, which may serve as a source of potable water for nearby residents, must be resistant to chemical and physical degradation to prevent contamination of the potable water. Unlike many commercially available resin coated proppants which are made from cured or partially cured resins which allow leachable chemical entities to escape into the water, proppants of this invention are chemically stable.

Conventional practice calls for the preparations of resin that can be used for resin coated proppants by reacting phenol and formaldehyde in the presence of an alkaline catalyst. The extent to which formaldehyde and/or phenol based compounds can be leached from the resin coated proppant can be determined using a water leachable test as will now be described. The test includes disposing at least 5 grams but less than 10 grams of the coated particles comprising a known quantity of coated resin into a vessel containing 50 ml of distilled water. The particles are covered by the water and continuously stirred throughout the test. The temperature of the water is 23° C. for 50 hours. The content of water leachable phenol and its derivatives is determined by colorimetry and the quantity of leachable phenol and derivatives is calculated based on the weight of the coating on the particles. Resin coated proppants of this invention have a water leachable phenolic content as low as 0.20 wt %, 0.15 wt %, 0.10 wt % or 0.05 wt % based on the weight of the coating.

A first example of a coating material that may be useful in creating cured resin coated proppants of this invention is a fluid composition comprising at least one sugar and at least one ammonium or metal salt of an inorganic acid. The sugar may be a reducing sugar or a non-reducing sugar. The expression "non-reducing sugar" should be understood in the conventional sense, namely that it relates to a sugar composed of several saccharide units, the carbon 1 of which carries the hemiacetal OH group and is the participant in a bond. The non-reducing sugar may be a non-reducing oligosaccharide including at most 10 saccharide units. Examples of such non-reducing sugars include disaccharides, such as trehalose, isotrehaloses, sucrose and isosucroses. Examples of trisaccharides include melezitose, gentianose, raffinose, erlose and umbelliferose. A suitable tetrasaccharide is stachyose and an example of a suitable pentasaccharide is verbascose. While the sugars identified above are suitable, preference is given to sucrose and trehalose and better still to sucrose.

The inorganic acid ammonium salt reacts with the non-reducing sugar under the effect of the heat to form a polymeric network. The inorganic acid ammonium salt is chosen from ammonium sulfates, in particular ammonium hydrogensulfate $NH_4HSO_4$ and ammonium sulfate $(NH_4)_2SO_4$, ammonium phosphates, in particular monoammonium phosphate $NH_4H_2O_4$, diammonium phosphate $(NH_4)_2HPO_4$ and ammonium phosphate $(NH_4)_3PO_4$, ammonium nitrates and ammonium carbonates, in particular ammonium bicarbonate $NH_4HCO_3$ and ammonium carbonate $(NH_4)_2CO_3$. The inorganic acid ammonium salt is preferably chosen from sulfates and phosphates, advantageously sulfates.

A second example of a coating material that may be useful in creating cured resin coated proppants of this invention is a fluid composition comprising at least one sugar and at least one organic polycarboxylic acid or anhydride thereof. The term "organic polycarboxylic acid" is understood to mean an organic acid comprising at least two carboxyl functional groups, preferably at most 4 carboxyl functional groups and advantageously at most 3 carboxyl functional groups. The organic polycarboxylic acid acts as crosslinking agent which is capable of reacting with the monosaccharide(s) and/or polysaccharide(s) under the effect of heat to form ester bonds which result in the formation of a polymeric network. The organic polycarboxylic acid is chosen from organic polycarboxylic acids exhibiting a molar mass of less than or equal to 1000, preferably of less than or equal to 750 and advantageously of less than or equal to 500. Preferably, the organic polycarboxylic acid is a saturated or unsaturated and linear or branched alicyclic acid, a cyclic acid or an aromatic acid.

The organic polycarboxylic acid can be a dicarboxylic acid, for example oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and its derivatives, in particular comprising at least one boron or chlorine atom, tetrahydrophthalic acid and its derivatives, in particular comprising at least one chlorine atom, such as chlorendic acid, isophthalic acid, terephthalic acid, mesaconic acid and citraconic acid, or a dicarboxylic acid precursor, in particular an anhydride, such as maleic anhydride, succinic anhydride and phthalic anhydride; a tricarboxylic acid, for example citric acid, tricarballylic acid, 1,2,4-butanetricarboxylic acid, aconitic acid, hemimellitic acid, trimellitic acid and trimesic acid; or a tetracarboxylic acid, for example 1,2,3,4-butanetetracarboxylic acid and pyromellitic acid.

The coating material can comprise, in addition to the compounds mentioned, the conventional additives below in the following proportions, calculated on the basis of 100 parts by weight of sugar and either an inorganic acid ammonium salt or organic polycarboxylic acid:

from 0 to 2 parts of silane, in particular an aminosilane,
from 0 to 20 parts of oil, preferably from 4 to 15 parts,
from 0 to 20 parts of glycerol, preferably from 0 to 10 parts,
from 0 to 5 parts of a silicone, and
from 0 to 30 parts of an "extender".

The role of these additives is known and is briefly restated here. The silane acts as an antiaging agent. The oils are dust-preventing and hydrophobic agents. The glycerol acts as plasticizer and makes it possible to prevent pregelling of the coating material. The silicone is a hydrophobic agent having the role of reducing the absorption of water by the inorganic substrate. The "extender" is an organic or inorganic filler, soluble or dispersible in the coating material, which makes it possible to reduce the cost of the coating material.

Referring now to the drawings, FIG. 1 is a cross-sectional representation of a resin coated proppant of this invention. Proppant 10 includes substrate 12 and a layer of cured resin 14. In this embodiment the coating of cured resin completely covers the exterior surface of the proppant. Substrate 22 may be a sintered particle of alumina and silica.

Figure 2:
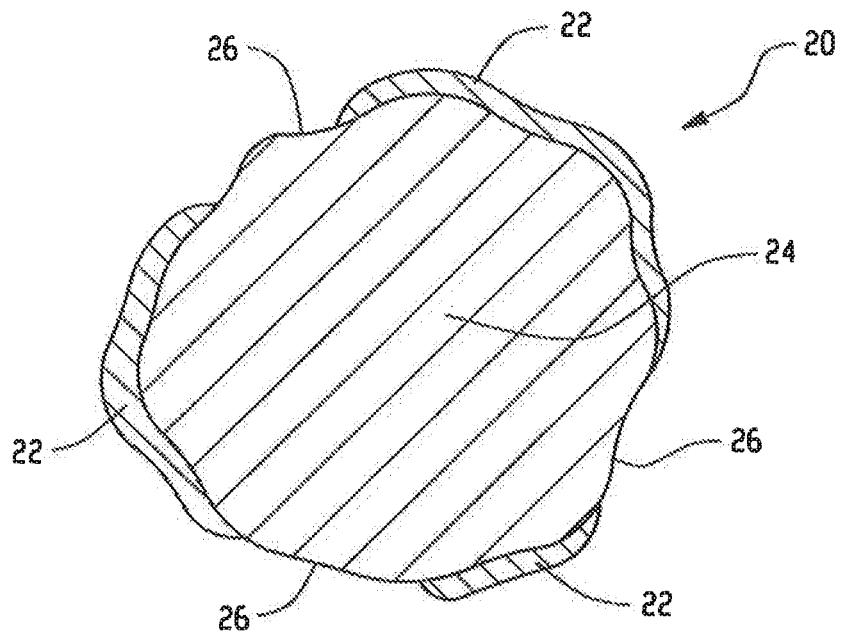
FIG. 2—cross-section of a second embodiment of a proppant of this invention.

FIG. 2 discloses a partially coated proppant. Proppant 20 includes resin coatings 22, substrate 24, and uncoated portions of substrate represented by 26. As depicted in FIGS. 1 and 2, proppants of this invention may be fully coated or partially coated, respectively.

Figure 3:
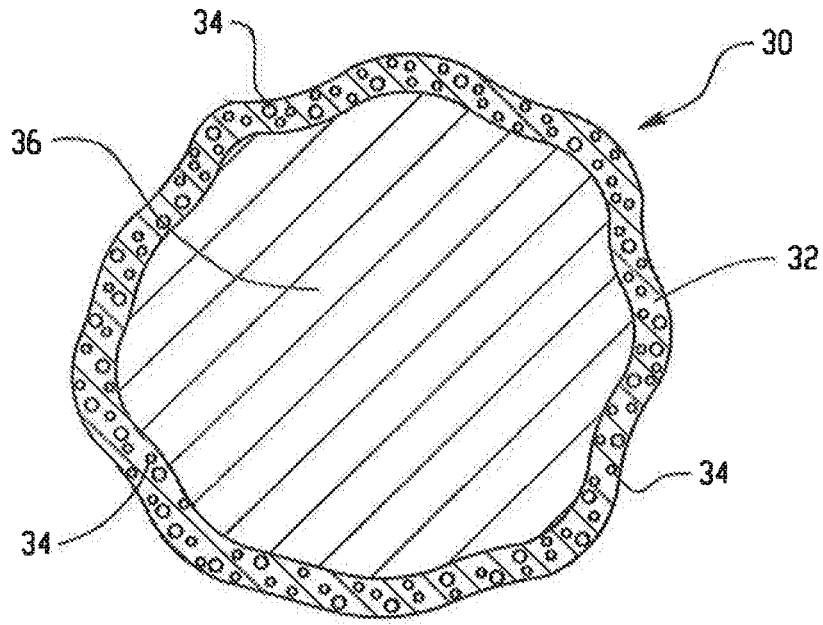
FIG. 3—cross-section of a third embodiment of a proppant of this invention; and, FIG. 4—process steps.

FIG. 3 discloses proppant 30 which comprises a substrate 36 and coating 32. Coating 32 comprises gas bubbles 34 which are entrapped in coating 32 thereby increasing the porosity of coating 32. The bubbles may be created in situ by gases which may emanate from the proppant during the manufacturing process. Alternatively, the bubbles may be incorporated into the resin prior to applying the resin to the surface of the substrate. Surfactant may be used to create bubbles within the resin coating. The porosity of the coating may be 5%, 10%, or 20% based on the total weight of the resin.

Controlling the amount of coating on the substrate may be important to controlling the conductivity of the fluid through the proppant pack in a downhole application. The amount of coating on an individual proppant particle may be less than 20% of the coated particle's total weight, more preferably less than 10% particle's total weight.

Controlling the specific gravity of the coated particle is important to making sure that the proppant is transported to the correct depth within the wellborn. The specific gravity of the coated proppant may be 2% less than the specific gravity of the substrate by itself. More preferably, the specific gravity may be 5% or even 10% less than the specific gravity of the substrate.

Individual proppant particles may be coated with a single coated layer. Proppant particles may be also coated with a first layer having a first chemical composition and then a second layer having a second chemical composition which is different from the first chemical composition. The first layer may be a partial coating over the substrate and the second layer may be a partial or a full coating over the substrate.

Figure 4:
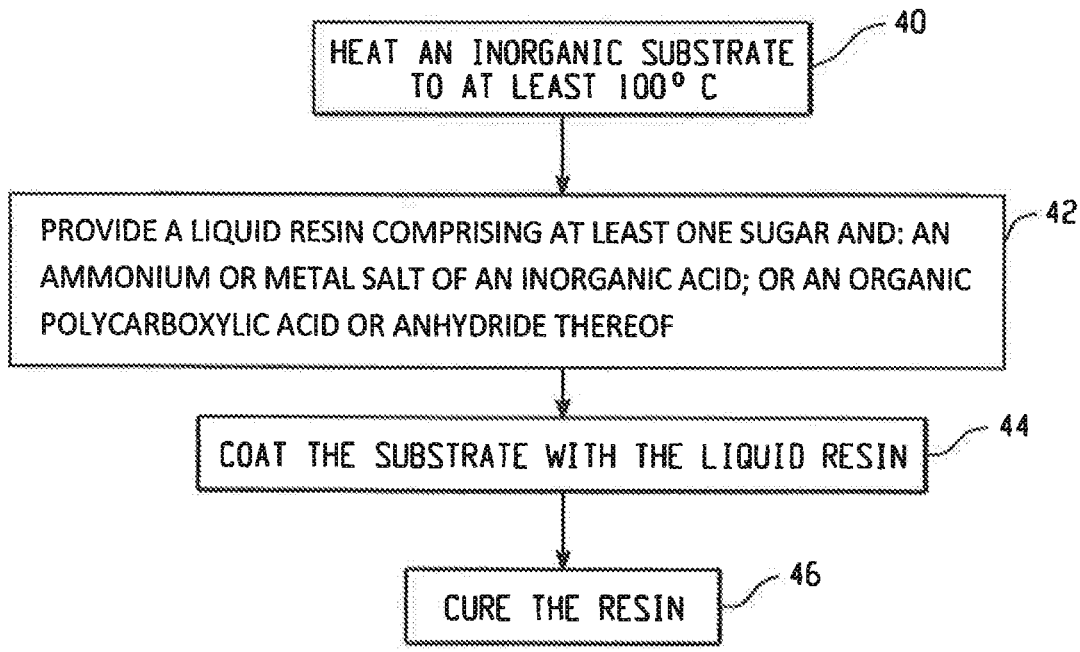

FIG. 4 discloses the following process steps. Step 40 comprises providing an inorganic substrate. The substrate is heated to at least 100° C. Step 42 comprises providing a liquid resin comprising at least one sugar and an ammonium or metal salt of an inorganic acid or an organic polycarboxylic acid or anhydride thereof. Step 44 comprises coating the inorganic substrate with the liquid resin. Step 46 comprises curing the resin thereby forming a coated particle comprising a cured coating. Coating the particles may be accomplished by immersing the substrates in a liquid resin thereby fully coating the exterior surface of each proppant particle. If the particles are to be partially coated or fully coated, the particles may be made to free fall through a space where the liquid resin can be sprayed onto the particles as they are falling. By controlling the rate of fall and the rate of spraying individual particles can be fully coated or partially coated to the extent desired.

Resin coated proppants of this invention were prepared as follows. Uncoated, inorganic, particulate substrates were heated to 170° C. in a fluidized bed coater for 30 minutes. The heated particulate substrates were then coated with a liquid resin prepared with 85 parts of saccharose and 15 parts of ammonium sulfate at the same temperature (170° C.) for one hour. The coated particulates were then cooled down. Then the coated particulates were heated to 200° C. for one hour and allowed to cool to room temperature.

The weight of the coating on the coated particles was then determined using the following procedure. The weight of each cooled coated proppant was measured to establish a first weight for each coated particle. The cooled coated particles were then heated from 25° to 600° C. under air to promote decomposition and volatilization of organic compounds. The heated particles were then cooled and each one was weighed to establish a second weight for each particle. The difference between the first weight and the second weight was used to determine the weight of the coating on each particle. The amount of dried resin was approximately 5 weight percent of the weight of the resin coated particle's total weight.

Many different aspects and embodiments of the inventions described herein are possible. After reading this specification, skilled artisans will appreciate that those aspects and embodiments are only illustrative and do not limit the scope of the present invention. Embodiments may be in accordance with any one or more of the embodiments listed below.

Embodiment 1

A proppant particle comprising an inorganic substrate and a polymeric coating comprising a product produced by the reaction of at least one sugar and at least one compound selected from the group consisting of: (1) an ammonium or metal salt of an inorganic acid, and (2) an organic polycarboxylic acid or anhydride thereof.

Embodiment 2

The proppant particle of embodiment 1 wherein the coating is secured to the surface of the substrate and exposed to the environment surrounding the proppant particle.

Embodiment 3

The proppant particle of embodiment 1 wherein the sugar includes a reducing sugar.

Embodiment 4

The proppant particle of embodiment 3 wherein the reducing sugar is a monosaccharide including from 3 to 8 carbon atoms.

Embodiment 5

The proppant particle of embodiment 4 wherein the monosaccharide is selected from the group consisting of glucose, mannose, galactose and mixtures thereof.

Embodiment 6

The proppant particle of embodiment 3 wherein the reducing sugar is a polysaccharide comprising at least one unit chosen from glucose, mannose or galactose.

Embodiment 7

The proppant particle of embodiment 6 wherein the polysaccharide is composed of at least 50 weight percent glucose units.

Embodiment 8

The proppant particle of claim 1 wherein the sugar includes a non-reducing sugar.

Embodiment 9

The proppant particle of embodiment 8 wherein the non-reducing sugar is a non-reducing oligosaccharide including at most 10 saccharide units.

Embodiment 10

The proppant particle of embodiment 9 wherein the non-reducing oligosaccharide is selected from the group consisting of trehalose, isotrehalose, sucrose, isosucroses, melezitose, gentianose, raffinose, erlose, umbelliferose, stachyose and verbascose.

Embodiment 11

The proppant particle of embodiment 10 wherein the non-reducing oligosaccharide is sucrose or trehalose.

Embodiment 12

The proppant particle of embodiment 1 wherein the inorganic acid ammonium salt is selected from the group consisting of ammonium sulfates, ammonium phosphates, ammonium nitrates, ammonium carbonates and mixtures thereof.

Embodiment 13

The proppant particle of embodiment 12 wherein the inorganic acid ammonium salt is an ammonium sulfate or an ammonium phosphate.

Embodiment 14

The proppant particle of embodiment 1 wherein the inorganic acid metal salt is selected from the group consisting of sulfates, chlorides, nitrates, phosphates, carbonates and mixtures thereof.

Embodiment 15

The proppant particle of embodiment 14 wherein the inorganic acid metal salt is a sodium, magnesium, iron, cobalt, nickel, copper, zinc or aluminum salt.

Embodiment 16

The proppant particle of embodiment 15 wherein the inorganic metal salt is aluminum sulfate or copper sulfate.

Embodiment 17

The proppant particle of embodiment 1 wherein the polymeric coating is the product of the reaction of sucrose and ammonium sulfate.

Embodiment 18

The proppant particle of embodiment 1 wherein the polycarboxylic acid is a saturated or unsaturated and linear or branched linear acid, a cyclic acid or an aromatic acid.

Embodiment 19

The proppant particle of embodiment 1 wherein the organic polycarboxylic acid is a dicarboxylic acid, tricarboxylic acid or tetracarboxylic acid.

Embodiment 20

The proppant particle of embodiment 1 wherein the organic polycarboxylic acid is oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid, tetrahydrophthalic acid, a tricarboxylic acid; or a tetracarboxylic acid.

Embodiment 21

The proppant particle of embodiment 1 wherein the polymeric coating is the product of the reaction of dextrose or sucrose and citric acid.

Embodiment 22

The proppant particle of embodiment 1 wherein the coating comprises less than 0.1 weight percent leachable phenol or phenolic derivatives.

Embodiment 23

The proppant particle of embodiment 1 wherein the product of cross-linked sugars represents at least 50 weight percent of said coating's total weight.

Embodiment 24

The proppant particle of embodiment 1 wherein the coating comprises one or more additives selected from the group consisting of pigments, tints, dyes, optical brighteners, propylene carbonates, coloring agents, fluorescent agents, whitening agents, UV absorbers UV reflectors, light stabilizers, defoaming agents, processing aids, mica and talc.

Embodiment 25

The proppant particle of embodiment 1 wherein the inorganic substrate is selected from the group consisting of sintered particles, bonded non-sintered particles, sand, and glass beads.

Embodiment 26

The proppant particle of embodiment 1 wherein the proppant particle has a total weight and the coating represents less than 20% of the proppant particle's total weight.

Embodiment 27

The proppant particle of embodiment 26 wherein the coated particle has a total weight and the coating represents less than 10% of the coated particle's total weight.

Embodiment 28

The proppant particle of embodiment 1 wherein the specific gravity of the proppant particle is at least 5% less than the specific gravity of the inorganic substrate.

Embodiment 29

The proppant particle of embodiment 28 wherein the specific gravity of the proppant particle is at least 10% less than the specific gravity of the inorganic substrate.

Embodiment 30

A process for manufacturing a proppant particle comprising the steps of providing a plurality of granular inorganic substrates heated to a temperature greater than 100° C.; providing a liquid resin comprising at least one sugar and at least one compound selected from the group consisting of (1) an ammonium or metal salt of an inorganic acid and (2) an organic polycarboxylic acid or anhydride thereof; coating the substrates with the liquid resin; and treating the substrate coated with the liquid resin to cause the formation of a polymeric layer on the surface of the inorganic substrate.

Embodiment 31

The process of embodiment 30 wherein the coating step comprises causing the substrates to free fall and coating the substrates with the liquid resin during the free fall.

What is claimed is:
1. A proppant particle, comprising:
an inorganic substrate; and
a polymeric coating comprising a product produced by the reaction of at least one sugar and at least one compound selected from the group consisting of: (1) an ammonium or metal salt of an inorganic acid, and (2) an organic polycarboxylic acid or anhydride thereof.
2. The proppant particle of claim 1 wherein said coating is secured to the surface of said substrate and exposed to the environment surrounding said proppant particle.
3. The proppant particle of claim 1 wherein the sugar includes a reducing sugar.

4. The proppant particle of claim 3 wherein the reducing sugar is a monosaccharide including from 3 to 8 carbon atoms.

5. The proppant particle of claim 4 wherein the monosaccharide is selected from the group consisting of glucose, mannose, galactose and mixtures thereof.

6. The proppant particle of claim 3 wherein the reducing sugar is a polysaccharide comprising at least one unit chosen from glucose, mannose or galactose.

7. The proppant particle of claim 6 wherein the polysaccharide is composed of at least 50 weight percent glucose units.

8. The proppant particle of claim 1 wherein the sugar includes a non-reducing sugar.

9. The proppant particle of claim 8 wherein the non-reducing sugar is a non-reducing oligosaccharide including at most 10 saccharide units.

10. The proppant particle of claim 9 wherein the non-reducing oligosaccharide is selected from the group consisting of trehalose, isotrehalose, sucrose, isosucroses, melezitose, gentianose, raffinose, erlose, umbelliferose, stachyose and verbascose.

11. The proppant particle of claim 10 wherein the non-reducing oligosaccharide is sucrose or trehalose.

12. The proppant particle of claim 1 wherein the inorganic acid ammonium salt is selected from the group consisting of ammonium sulfates, ammonium phosphates, ammonium nitrates, ammonium carbonates and mixtures thereof.

13. The proppant particle of claim 12 wherein the inorganic acid ammonium salt is an ammonium sulfate or an ammonium phosphate.

14. The proppant particle of claim 1 wherein the inorganic acid metal salt is selected from the group consisting of sulfates, chlorides, nitrates, phosphates, carbonates and mixtures thereof.

15. The proppant particle of claim 14 wherein the inorganic acid metal salt is a sodium, magnesium, iron, cobalt, nickel, copper, zinc or aluminum salt.

16. The proppant particle of claim 15 wherein the inorganic metal salt is aluminum sulfate or copper sulfate.

17. The proppant particle of claim 1 wherein the polymeric coating is the product of the reaction of sucrose and ammonium sulfate.

18. The proppant particle of claim 1 wherein the polycarboxylic acid is a saturated or unsaturated and linear or branched linear acid, a cyclic acid or an aromatic acid.

19. The proppant particle of claim 1 wherein the organic polycarboxylic acid is a dicarboxylic acid, tricarboxylic acid or tetracarboxylic acid.

20. The proppant particle of claim 1 wherein the organic polycarboxylic acid is oxalic acid, malonic acid, succinic acid, glutaric acid, adipic acid, pinielicacid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid, tetrahydrophthalic acid, a tricarboxylic acid; or a tetracarboxylic acid.

21. The proppant particle of claim 1 wherein the polymeric coating is the product of the reaction of dextrose or sucrose and citric acid.

22. The proppant particle of claim 1 wherein said coating comprises less than 0.1 weight percent leachable phenol or phenolic derivatives.

23. The proppant particle of claim 1 wherein said coating comprises one or more additives selected from the group consisting of pigments, tints, dyes, optical brighteners, propylene carbonates, coloring agents, fluorescent agents, whitening agents, UV absorbers UV reflectors, light stabilizers, defoaming agents, processing aids, mica and talc.

24. The proppant particle of claim 1 wherein said inorganic substrate is selected from the group consisting of sintered particles, bonded non-sintered particles, sand, and glass beads.

25. The proppant particle of claim 1 wherein said proppant particle has a total weight and said coating represents less than 20% of said proppant particle's total weight.

26. The proppant particle of claim 25 wherein said coated particle has a total weight and said coating represents less than 10% of said coated particle's total weight.

27. The proppant particle of claim 1 wherein the specific gravity of said proppant particle is at least 5% less than the specific gravity of said inorganic substrate.

28. The proppant particle of claim 27 wherein the specific gravity of said proppant particle is at least 10% less than the specific gravity of said inorganic substrate.

29. A process for manufacturing a proppant particle comprising the steps of:
   a. providing a plurality of granular inorganic substrates heated to a temperature greater than 100° C.;
   b. providing a liquid resin comprising at least one sugar and at least one compound selected from the group consisting of: (1) an ammonium or metal salt of an inorganic acid and (2) an organic polycarboxylic acid or anhydride thereof;
   c. coating said substrates with said liquid resin; and
   d. treating said substrate coated with said liquid resin to cause the formation of a polymeric layer on the surface of said inorganic substrate.

* * * * *